US012602948B2

(12) United States Patent　(10) Patent No.:　US 12,602,948 B2
Li et al.　(45) Date of Patent:　Apr. 14, 2026

(54) GENERATING COMPUTER AUGMENTED MAPS FROM PHYSICAL MAPS

(71) Applicant: Telefonaktiebolaget LM Ericsson (publ), Stockholm (SE)

(72) Inventors: Xiaoping Li, Karlskrona (SE); Tommy Arngren, Södra Sunderbyn (SE); Andreas Kristensson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 751 days.

(21) Appl. No.: 17/793,951

(22) PCT Filed: Jan. 30, 2020

(86) PCT No.: PCT/SE2020/050078
§ 371 (c)(1),
(2) Date: Jul. 20, 2022

(87) PCT Pub. No.: WO2021/154129
PCT Pub. Date: Aug. 5, 2021

(65) Prior Publication Data
US 2023/0050644 A1　Feb. 16, 2023

(51) Int. Cl.
| *G06V 30/422* | (2022.01) |
| *G06T 19/00* | (2011.01) |
| *G06V 10/10* | (2022.01) |
| *G06V 10/22* | (2022.01) |
| *G06V 20/20* | (2022.01) |
| *G06V 40/13* | (2022.01) |
| *G06V 40/20* | (2022.01) |

(52) U.S. Cl.
CPC .......... *G06V 30/422* (2022.01); *G06T 19/006* (2013.01); *G06V 10/17* (2022.01); *G06V 10/235* (2022.01); *G06V 20/20* (2022.01); *G06V 40/1312* (2022.01); *G06V 40/20* (2022.01)

(58) Field of Classification Search
CPC ...... G06V 30/422; G06V 10/17; G06V 20/20; G06V 10/235; G06V 40/1312; G06V 40/20; G06T 19/006
See application file for complete search history.

(56) References Cited

U.S. PATENT DOCUMENTS

| 9,437,047 | B2 * | 9/2016 | Chang | ..................... G06T 17/05 |
| 9,792,368 | B1 * | 10/2017 | Amacker | ................ H04W 4/02 |

(Continued)

OTHER PUBLICATIONS

Qiu, Lei, et al. "Digital map using augmented reality on smart devices: Motivation, design, and implementation." 2017 International Conference on Image and Vision Computing New Zealand (IVCNZ). IEEE, 2017. (Year: 2017).*

(Continued)

*Primary Examiner* — Utpal D Shah

(74) *Attorney, Agent, or Firm* — Murphy, Bilak & Homiller, PLLC

(57) ABSTRACT

A method by a computing device obtains a digital image of a physical map, identifies features in the digital image, and obtains map augmentation information based on the identified features. The method then generates an augmented map based on the map augmentation information, and provides the augmented map for display. Related mobile devices and computer program products are disclosed.

19 Claims, 9 Drawing Sheets

(56) References Cited

U.S. PATENT DOCUMENTS

| 10,140,769 B2 * | 11/2018 | Kim | ..................... G06T 19/006 |
| 2011/0013014 A1 | 1/2011 | Wassingsbo | |
| 2015/0199852 A1 | 7/2015 | Chang et al. | |
| 2017/0328730 A1 | 11/2017 | Amacker et al. | |
| 2019/0392643 A1 * | 12/2019 | Busto | ..................... G06T 17/20 |
| 2021/0082202 A1 * | 3/2021 | Finman | .................. G06T 17/05 |

OTHER PUBLICATIONS

Reitmayr, Gerhard , et al., "Localisation and Interaction for Augmented Maps", Proceedings of the International Symposium on Mixed and Augmented Reality, 2005, 1-10.
Satriadi, Kadek Ananta, et al., "Augmented Reality Map Navigation with Freehand Gestures", IEEE Conference on Virtual Reality and 3D User Interfaces, 2019, 1-11.
Bobrich, Joachim, et al., "Augmented Maps", Symposium on Geospatial Theory, Processing and Applications, Ottawa, 2002, 1-4.
Komninos, Andreas, et al., "Use of Self-Reporting Questionnaires to Evaluate Augmented Paper Maps for Group Navigation", Big data analytics in the social and ubiquitous context: 5th International Workshop on Modeling Social Media, MSM 2014, 5th International Workshop on Mining Ubiquitous and Social Environments, MUSE 2014, Oct. 30, 2015, 125-137.
Morrison, Ann, et al., "Collaborative use of mobile augmented reality with paper maps", Computers & Graphics, vol. 35, 2011, 789-799.

* cited by examiner

Physical Map of Las
Vegas in English
(e.g., paper map)
110

Digital Map of Las
Vegas from Chinese
Language Server
90

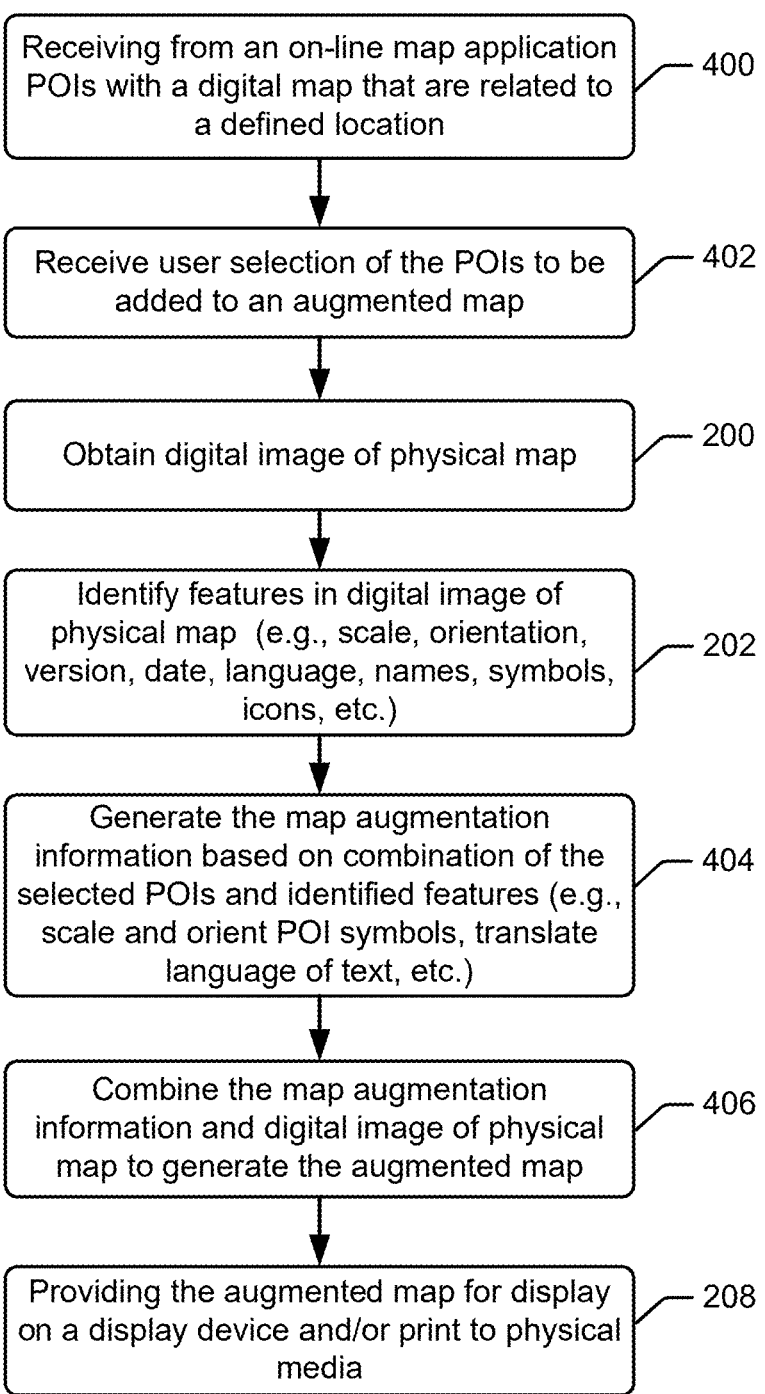

Receiving from an on-line map application POIs with a digital map that are related to a defined location ⟋— 400

Receive user selection of the POIs to be added to an augmented map ⟋— 402

Obtain digital image of physical map ⟋— 200

Identify features in digital image of physical map (e.g., scale, orientation, version, date, language, names, symbols, icons, etc.) ⟋— 202

Generate the map augmentation information based on combination of the selected POIs and identified features (e.g., scale and orient POI symbols, translate language of text, etc.) ⟋— 404

Combine the map augmentation information and digital image of physical map to generate the augmented map ⟋— 406

Providing the augmented map for display on a display device and/or print to physical media ⟋— 208

*Figure 4*

GENERATING COMPUTER AUGMENTED MAPS FROM PHYSICAL MAPS

TECHNICAL FIELD

The present disclosure relates to computer assisted navigation using digital maps.

BACKGROUND

Computer navigation systems have significantly replaced physical maps as a preferable way for people to geographically navigate and obtain information on points-of-interest (POIs). Example mobile devices providing navigation functionality include smartphones, smart watches, tablet computers, laptop computers, car navigation units, handheld satellite navigation devices, etc. These mobile devices typically access routing and POI information from map servers, e.g., Google Maps, which are networked through wireless modems, e.g., cellular/WiFi modem. However people still prefer to use physical maps in some situations, such as when tourism offices provide tourist focused physical maps which highlight POIs for tourists, walking tours, venues associated with scheduled events, etc. Because computer navigation systems rely on national or regional databases, they likely don't contain the more locally customized information provided by physical maps.

SUMMARY

Various embodiments herein are directed to enabling various information provided by physical maps and computer maps to be combined into augmented maps for navigation. A physical map can include, without limitation, any map provided on physical medium such as paper, plastic, textile or other non-digital medium. Example types of a physical map include a paper map, a magazine, a notice board or bill board.

Some embodiments disclosed herein are directed to a method by a computing device that obtains a digital image of a physical map, identifies features in the digital image, and obtains map augmentation information based on the identified features. The method then generates an augmented map based on the map augmentation information, and provides the augmented map for display.

In some further embodiments the computing device is a mobile device or a map server.

Some other related embodiments are directed to a computing device that is configured to obtain a digital image of a physical map, identify features in the digital image, and obtain map augmentation information based on the identified features. The computing device then generates an augmented map based on the map augmentation information, and provides the augmented map for display.

Still some other related embodiments are directed to a computer program product for a computing device. The computer program product includes a non-transitory computer readable medium storing program code executable by at least one processor of the computing device to perform operations. The operations include obtaining a digital image of a physical map, identifying features in the digital image, and obtaining map augmentation information based on the identified features. The operations further include generating an augmented map based on the map augmentation information, and providing the augmented map for display.

Various problems that can arise with existing computer navigation maps include when traveling to an area with poor wireless connectivity, such as where no cellular coverage or poor coverage in provided in remote areas, a user needs to pre-plan before traveling a desired route and identify POIs using an on-line digital map and then manually transfer the navigation information as mark-ups and annotations on a physical map that will be used during the trip. Mobile devices that are configured to support computer navigation also have limitations as to their battery life, relatively small screen size, memory constraints, etc. A physical map enables larger geographic areas to be viewed more easily and multiple people can simultaneously view the same physical map to facilitate discussions. However, physical maps have their own unique limitations, including that the printed information is static and may not be easily adaptable by persons through mark-ups and annotations without permanently defacing the physical map. These and other embodiments of the present disclosure may facilitate a person's ability to not only refer to information provided by both types of maps but to also view a combination of the information as an augmented map, thereby providing the user with a more intuitive and greater understanding of a geographic area. The user can be provided more geographically focused information which can reflect information associated with temporary scheduled events that would not be otherwise available through digital map provided by on-line map servers.

Other methods, computing devices, and computer program products according to embodiments will be or become apparent to one with skill in the art upon review of the following drawings and detailed description. It is intended that all such additional methods, computing devices, and computer program products be included within this description and protected by the accompanying claims.

BRIEF DESCRIPTION OF THE DRAWINGS

Aspects of the present disclosure are illustrated by way of example and are not limited by the accompanying drawings. In the drawings:

FIG. 4 illustrates a method and operations by an application executed by the mobile device of FIG. 1B which interfaces with an on-line map application of the map server in accordance with some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Various problems that can arise with existing computer navigation maps include when traveling to an area with poor wireless connectivity, such as where no cellular coverage or poor coverage in provided in remote areas, a user needs to pre-plan before traveling a desired route and identify POIs using an on-line digital map and then manually transfer the navigation information as mark-ups and annotations on a physical map that will be used during the trip. Mobile devices that are configured to support computer navigation also have limitations as to their battery life, relatively small screen size, memory constraints, etc. Strong sunlight can making viewing a digital map on display of a mobile device difficult. A physical map enables larger geographic areas to be viewed more easily and multiple people can simultaneously view the same physical map to facilitate discussions. However, physical maps have their own unique limitations, including that the printed information is static and may not be easily adaptable by persons through mark-ups and annotations without permanently defacing the physical map.

As used herein, a "physical map" can include, without limitation, any map provided on physical medium such as paper, plastic, textile or other non-digital medium. Example types of a physical map include a paper map, a magazine, a notice board or bill board.

Figure 1A:
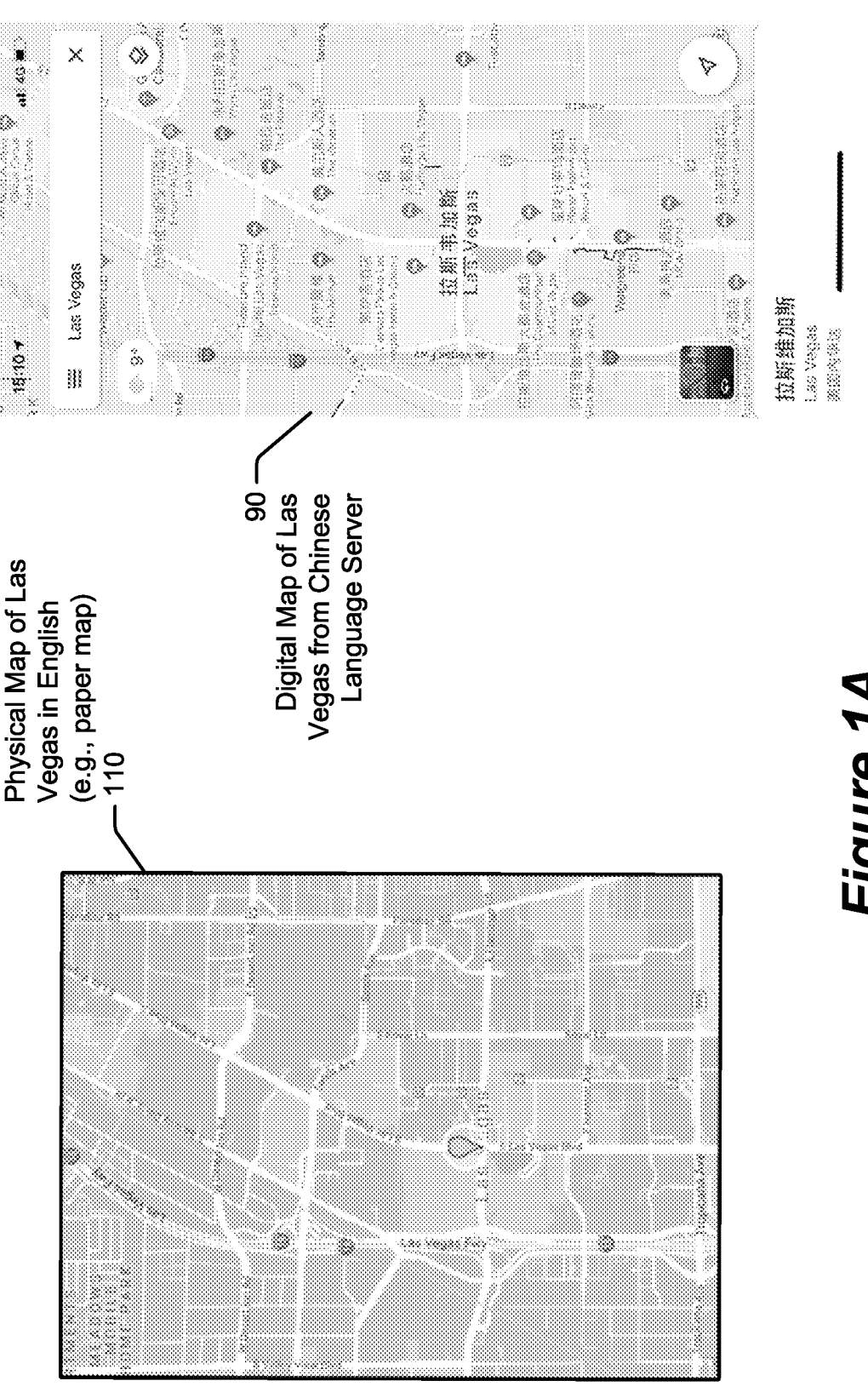
FIG. 1A illustrates a physical map of Las Vegas with points-of-interest in the English language and a digital map of Las Vegas obtained from a Chinese language map server.

Situations can also arise in many geographic areas where navigation information from an on-line map server is in a different language than physical maps obtained for those areas. For instance, referring to the example situation shown in FIG. 1A, when a Chinese tourist is visiting Las Vegas, the tourist may obtain physical map 110 of Las Vegas which shows all POI names in the local English language, while the tourist's mobile device may host a map application that is configured to query an on-line Chinese language map server to display a digital map 90 of Las Vegas. Consequently, when the Chinese tourist finds a location of his or her hotel or present location using the digital map 90 from the on-line Chinese language map server, it can be difficult to then find the same location on the physical map 110 due to the language differences and due to differences in the viewed orientations and/or scales between the digital map 90 and the physical map 110.

Accordingly, it can be cumbersome for a person to simultaneously refer to both digital maps and physical maps and even more cumbersome to attempt to combine information from a physical map with information from a digital map. Various embodiments of the present disclosure are directed to methods and operations by a mobile device that facilitate a person's ability to not only refer to information provided by both types of maps but to also view a combination of the information as an augmented map, thereby providing the user with a more intuitive and greater understanding of a geographic area.

Figure 1B:
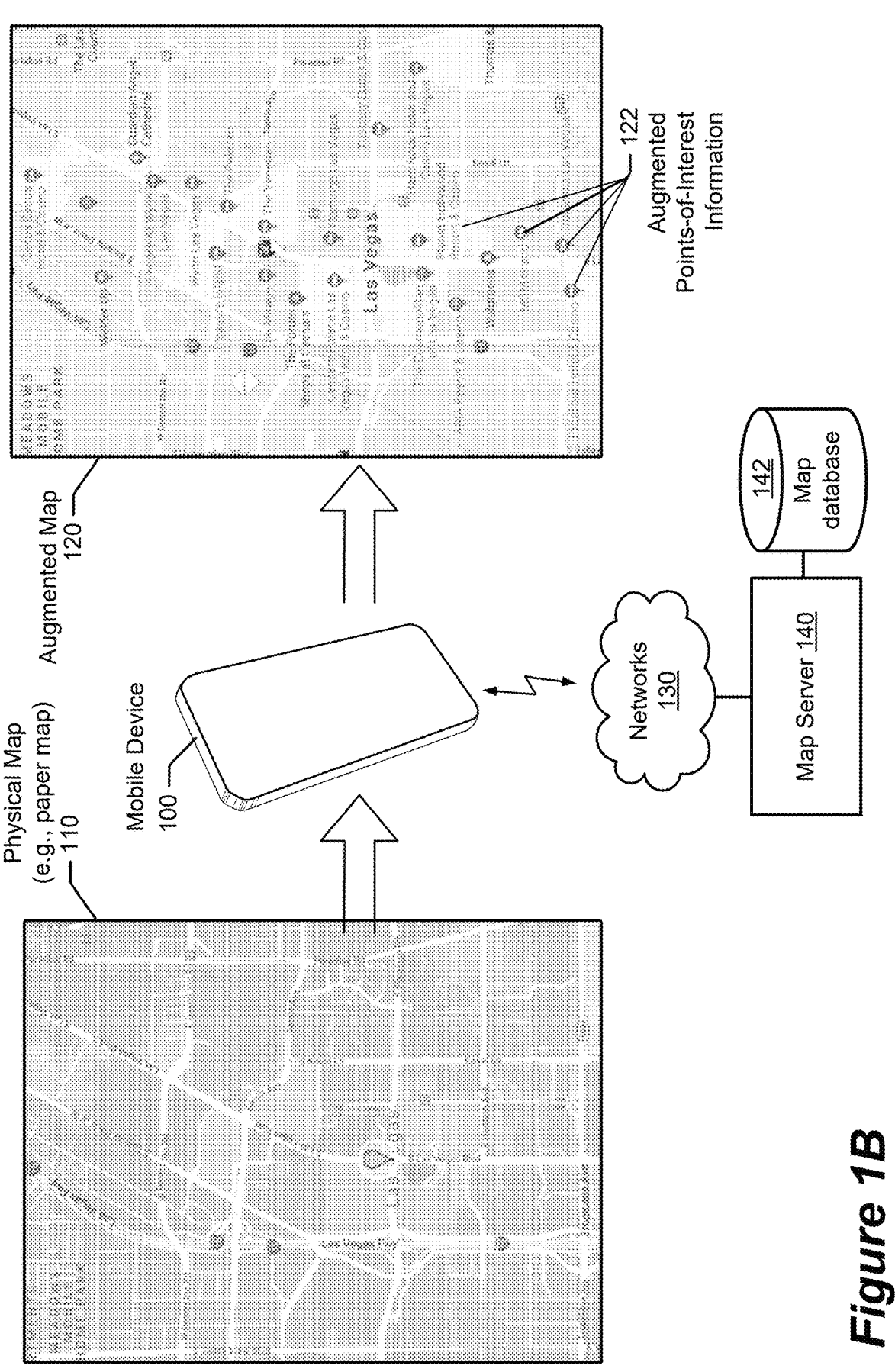
FIG. 1B illustrates a mobile device being used to generate an augmented map based on combination of a digital image of a physical map and map augmentation information in accordance with some embodiments.
Figure 2:
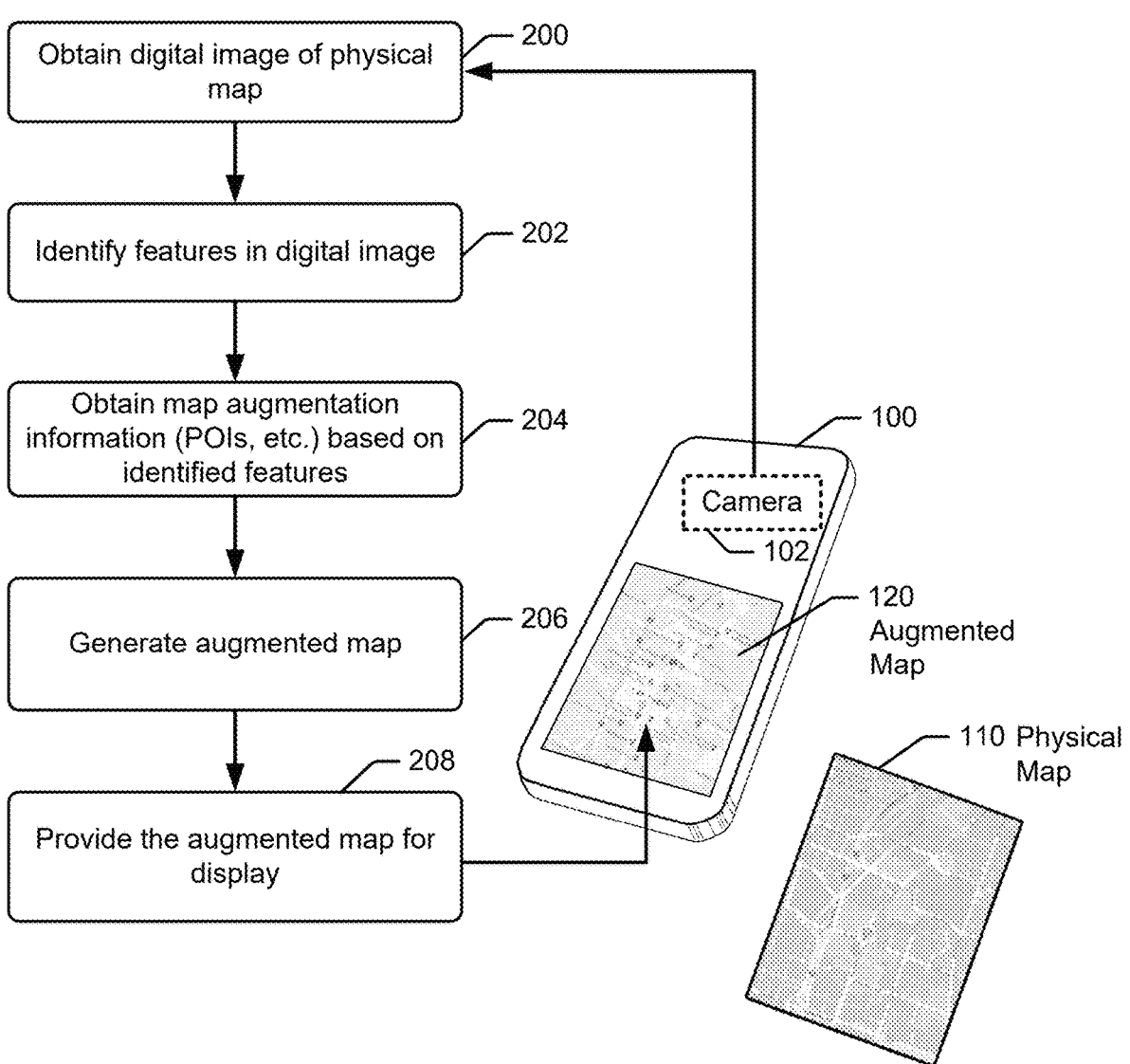
FIG. 2 illustrates a method and operations by the mobile device and/or the map server of FIG. 1B for generating the augmented map for display on a display device in accordance with some embodiments.

FIG. 1B illustrates a mobile device 100 that is operating according to some embodiments to generate an augmented map 120 based on features identified in a digital image of a physical map 110 and based on map augmentation information that is obtained based on the identified features. FIG. 2 illustrates a method and operations by the mobile device 100 and/or the map server 140 of FIG. 1B for generating the augmented map for display on a display device in accordance with some embodiments.

Referring to FIGS. 1 and 2, the mobile device 100 can be configured to obtain 200 a digital image of the physical map 110 and to identify 202 features in the digital image. The digital image of the physical map 110 may be obtained by taking a photo of the physical map 110 using a camera 102 of the mobile device 100 and/or using a camera or scanner device that is communicatively connected to the mobile device 100 (e.g., a camera of an augmented reality (AR) headset, virtual reality (VR) headset, or mixed reality (AR and VR capable) headset connected to the mobile device 100). Alternatively or additionally, the digital image of the physical map 110 may be obtained from a digital picture repository residing in the mobile device 100 and/or residing in a network server, such as the map server 140 and/or a map database 142, that is communicatively connected through one or more public/private networks 130 to the mobile device 100. The features that are identified 102 in the digital image can include, without limitation, POI names and locations, road names and locations, POI shape legends, textual descriptions of POIs, physical map scale and/or directional indications, etc.

The mobile device 100 can obtain 204 map augmentation information 122 based on the identified features. The map augmentation information 122 may be obtained 204 from local memory of the mobile device 100 and/or from the map server 140, such as by using the identified features as an index for requesting relevant map augmentation information, such as a keyword search based on text associated with identified features, location search based on geographic and/or relative locations of the identified features, etc. The map augmentation information 122 may include, for example, POI names and locations, road names and locations, textual descriptions of POIs, travel route indications, etc. The mobile device 100 then generates 206 an augmented map 120 based on the map augmentation information, and provides 208 the augmented map 120 for display. In the example of FIG. 2, the mobile device 100 displays the augmented map 120 on a display device of the mobile device 100 and/or on a display device that is communicatively connected to the mobile device, such as a VR headset.

In the example of FIG. 2, the augmented map 120 is generated by combining the map augmentation information and a digital map, e.g., provided by Google Maps, and the augmented map 120 is displayed on a display device which may reside in the mobile device 100 or be communicatively connected to the mobile device 100 (e.g., AR headset display, VR headset display, extended reality headset display, etc.). In the example of FIG. 1B, the augmented map 120 may be displayed on a display screen of the mobile device 100 as a combination of the map augmentation information (shown as POI information) 122 that are combined with a digital map.

Figure 3:
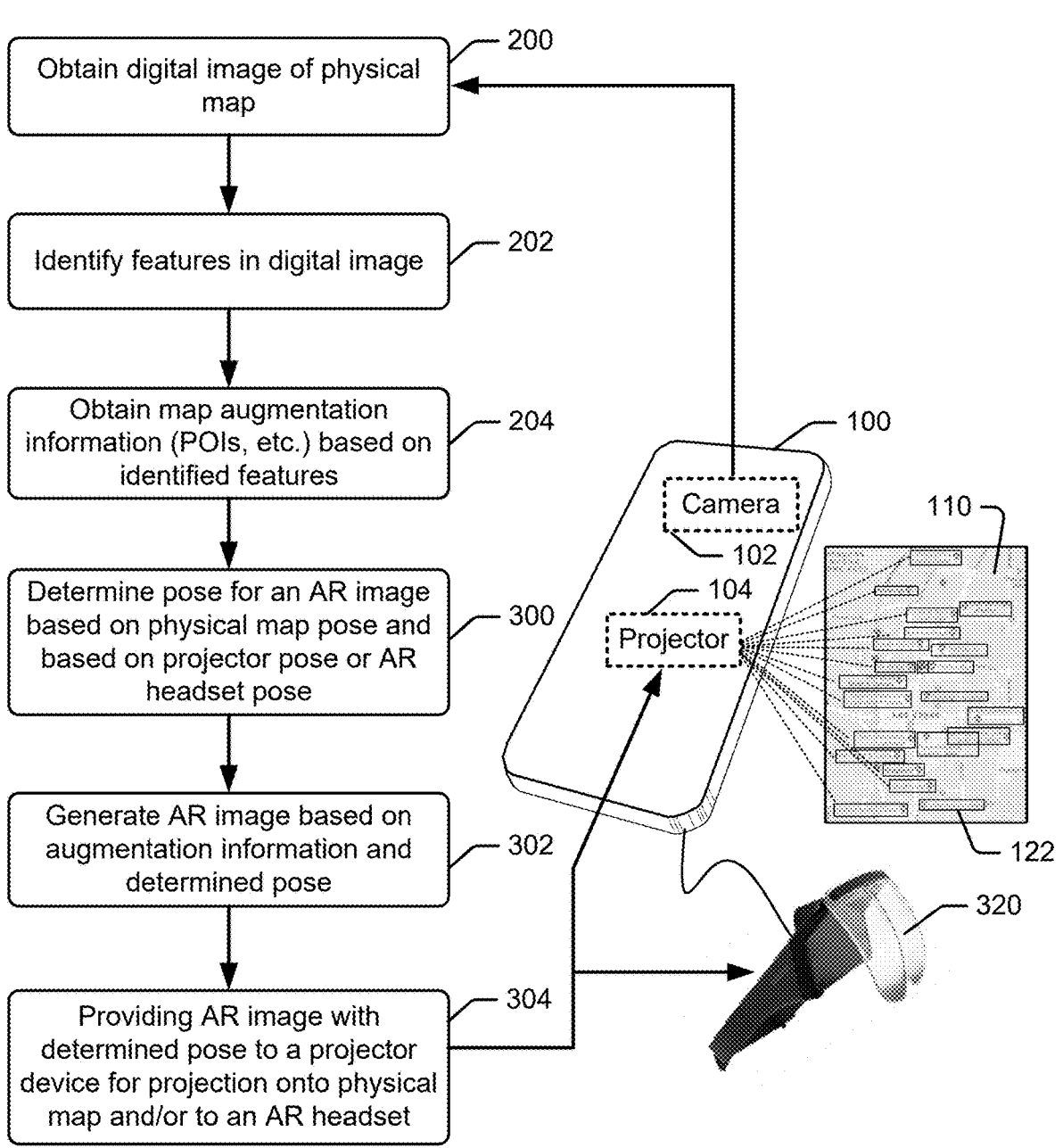
FIG. 3 illustrates another method and operations by the mobile device and/or the map server of FIG. 1B for generating the augmented map for projection on the physical map in accordance with some embodiments.

In an alternative embodiment, the augmented map 120 is generated by projecting the map augmentation information onto the physical map 110. FIG. 3 illustrates a corresponding method and operations by the mobile device 100, the map server 140, and/or another network node for generating the augmented map for projection on the physical map in accordance with some embodiments. Referring to FIG. 3, the augmentation information (shown as POI information) 122 is projected as an electronic overlay on the physical map 110 to visually create the augmented map 120 for viewing by a user. Projection of the augmentation information 122 may be performed by a projector component 104 of the mobile device 100, by a separate projector that is communicatively connected to the mobile device 100, and/or by providing the augmentation information 122 to a see-through display device of an AR headset 320 to view the augmentation information 122 as a virtual overlay that is displayed with a pose and scale which are controlled to align the displayed augmentation information 122 (illustrated as text and graphical symbols within boxes) with associated features (e.g., roads, intersections, labels, etc.) printed on the physical map 110.

Associated operations that can be performed by the mobile device 100, the map server 140, and/or another network node to project the augmentation information onto the physical map 110 will now be discussed in the context of one embodiment. The operations obtain 200 the digital image of the physical map 110, identify 202 features in the digital image, and obtain 204 map augmentation information based on the identified features. The operations to obtain 200, identify 202, and obtain 204 may be performed as explained above with regard to FIG. 2. The operations further determine 300 a pose for an AR image based on a pose of a projector device, e.g., projector 104, and a pose of the physical map 110, e.g., pose of identified features of the physical map 110. The relative poses may be determined by, for example, aiming a camera 102 at the physical map 110 and determining the pose for the AR image based on the pose of the digital image of the physical map and a known relationship between the poses of the camera 102 and the projector 104. The operations to generate (206 of FIG. 2) the augmented map can include generating 302 the AR image based on the map augmentation information and the determined pose. The operations to provide (208 of FIG. 2) the augmented map can include providing 304 the AR image to the projector device, e.g., projector 104, for projection with the determined pose onto the physical map 110.

Associated operations that can be performed by the mobile device 100, the map server 140, and/or another network node to provide the augmentation information to an AR headset 320 for display relative to features of the physical map 110 will now be discussed in the context of another embodiment. The operations obtain 200 the digital image of the physical map 110, identify 202 features in the digital image, and obtain 204 map augmentation information based on the identified features. The operations to obtain 200, identify 202, and obtain 204 may be performed as explained above with regard to FIG. 2. The operations further determine 300 a pose for an AR image based on a pose of the AR headset 320 and based on a pose of the physical map 110, e.g., pose of identified features of the physical map 110. The operations to generate (206 of FIG. 2) the augmented map can include generating 302 the AR image based on the map augmentation information and the determined pose. The operations to provide (208 of FIG. 2) the augmented map can include providing 304 the AR image to a see-through display screen of the AR headset 320 and/or a display screen of the mobile device 100 (e.g., smartphone display) for display with the determined pose relative to the features of the physical map 110. A user wearing the AR headset 320 can thereby view the augmented map as a combination of the overlaid AR image on the physical map.

In some embodiments the operations are performed by a stand-alone application executed by the mobile device 100. In some other embodiments at least some of the operations are performed by an application executed by the map server 150, such as a map server application hosted on a Google Maps server or other on-line map server. The operations may interface with a user to enable user guided electronic searches within the on-line map database 142 and then save user selected locations of the digital map into local memory of the mobile device 100. The user can take a digital image, e.g., photo, of the physical map 110 or aim a camera of the mobile device 100 toward the physical map 110 to enable the operations to identify features within the digital image of physical map. Operations identify features in the digital image of physical map 110, such as by comparing done the digital image to the digital map. The identified features are used to obtain the map augmentation information and generate augmented map. In some embodiments, the user may print the augmented map onto a physical medium, e.g., paper, and/or may mark-up the object map while viewing a projection of the augmentation information overlaid on the physical map.

As will be explained below, the user may provide commands to zoom-in and/or zoom-out to change how the level of detail of the map augmentation information that is displayed in the augmented map. For example, when the mobile device 100 is aligned with a certain part of the physical map 110, then a user can perform gestures relative to the displayed map and/or perform gestures relative to the physical map that are viewable by the camera, to cause operations to zoom-in and/or zoom-out the level of detail the map augmentation information that is displayed of augmented map. In a further example, when a restaurant is shown on the physical map, the mobile device 100 can be controlled to zoom-and to show more details relating to the restaurant, such as the opening hours of the restaurant, user reviews posted for the restaurant, photos of food dishes sold by the restaurant, and/or photos outside of and/or inside the restaurant.

Potential advantages of these and other embodiments disclosed herein is that the user can more effectively compare a physical map to a digital map (e.g., displayed Google map), and use the electronic combination of the information from both the physical map in the digital map provided by the augmented map. The user's understanding of geographic area can thereby be enhanced and the user can be provided more geographically focused information which can reflect information associated with temporary scheduled events that would not be otherwise available through digital math provided by on-line map servers. Various operations can facilitate a user's ability to mark-up the physical map with the map augmentation information or print the augmented map for use when traveling in areas with poor wireless connectivity and/or when the user desires to obtain navigation while traveling without needing to use to a capable mobile device. As will be explained in further detail below, operations can perform translations between languages, so that the augmented map is presented in the preferred language of the user irrespective of the original language used by the physical map.

Some further embodiments are directed to providing operations that can be added to or programmatically interface with a digital map application, such Google Maps or Apple Maps, executable by the mobile device 100. The digital map application operates to access a map database that resides within local memory of the mobile device 100 and/or which is accessible online, such as the map database 142 accessed via the map server 140 of FIG. 1B.

In one example scenario, a user uses the Google Maps application executed on the mobile device 100 to search for and save desired locations in a digital map. For instance, the user can search for specific locations such as a hotel, nearest supermarket, and tourist attractions in Las Vegas, Nevada U.S.A., and save those places for subsequent reference. The user can then click an icon within the application to trigger performance of new operational features. Three different example operational options user may be capable of selecting among include: "Instant", "Scan", and "Import". The "Instant" operation enables the user to aim the mobile device camera at the physical map to obtain a digital image thereof. The "Scan" operation enables the user to take a photo of the physical map using the mobile device camera to obtain a digital image thereof. The "Import" operation enables the user to obtain a digital image of the physical map by selecting among a gallery of photos within a photo application, e.g., Apple Photo application. The operations then identify features in the digital image, and may further identify the orientation of features of the physical map, scale of features of the physical map, language of features of the physical map, the names of the streets and the visual shapes of the streets as features of the physical map.

The operations may align the digital map, e.g., Google map, with the digital image of the physical map, and generate the augmented map based on adding the map augmentation information that was obtained based on features identified in the digital image of the physical map. As explained above, the features identified in the digital image of the physical map can include city/road/building names, geographic locations, textual descriptions of POIs, etc. As also explained above, the map augmentation information can include POIs and other information that is obtained from the digital map using queries based on the identified features within the digital image of physical map. The user may, for example, touch-select POIs and other information in the digital map to identify features that are to be included as part of the map augmentation information which is used to generate the augmented map. As explained above, the operations may display the augmented map (e.g., through the map application and/or a web browser), project the map augmentation information onto the physical map to generate augmented map (e.g., using a projector device (projector module, projector component, etc.) and/or an AR headset), and/or may print the augmented map through a printer device. A user may control what form of output of the augmented map is selectively provided. The user may also annotate the physical map using the map augmentation information that is displayed on the display device or projected onto the physical map.

FIG. 4 illustrates a method and operations by an application executed by the mobile device 100 of FIG. 1B which interfaces with an on-line map application of the map server 140 in accordance with some embodiments. Referring to FIG. 4, the operations receive 400 from the on-line map application, POIs within a digital map that are related to a defined location. The operations further receive 402 user selections of POIs of the digital map to be added to the augmented map. The operations obtain 200 a digital image of the physical map, which may be performed according to the operations described above with regard to FIGS. 1-3. The operations to obtain (204 of FIG. 2) the map augmentation information can include generating 404 the map augmentation information based on a combination of the selected POIs and the features that have been identified (202 in FIG. 2) in the digital image. Generation 404 of the map augmentation information can include, for example, scaling and/or orienting POIs identified as features in the physical map relative to the on-line digital map, and/or translating the language of textual features of the physical map to the user's preferred language. The operations to generate (206 of FIG. 2) the augmented map can include combining 406 the map augmentation information and the digital image of the physical map. The augmented map can be provided 208 for display on a display device, projector device, and/or printed through a printer device onto paper or other physical media.

Some further embodiments are directed to providing operations that can operate at least partially as a stand-alone augmented map application executable by the mobile device 100.

In one example scenario, a user can mark or save selected locations in an on-line map application, such as Google Maps or Apple Maps, take a screenshot of the display device showing the marked/saved locations and save it to a photo gallery. Then the user can also take a photo of the physical map or otherwise obtain a digital image of the physical map and save it in the photo gallery. The user can then operate the stand-alone augmented map application to import from the photo gallery or other photo buffer, the screenshot of the marked map display and the digital image of the physical map. The stand-alone augmented map application can operate to identify and compare features contained in the screenshot of the marked map display to features in the digital image of the physical map, such as the names of landmarks and streets, and/or may identify and compare visual shapes of the features contained in the screenshot of the marked map display to features in the digital image of the physical map. The operations may perform language translation of textual features to a preferred language of the user. The operations may adjust the orientation and/or scale of the features contained in the screenshot of the marked map display based on the orientation and/or scale of the features contained in the digital image of the physical map.

The operations may project the digital image of the physical map with added features, e.g., highlighted landmarks. The user can use projected digital image with added features as a reference to facilitate annotation of the added features at the proper locations on the physical map. Alternatively or additionally, the user may provide information that is captured as part of the digital image of the physical map and/or may provide input relative to the display digital map, e.g., Google Maps map, that is included as map augmentation information, e.g., POIs, in the augmented map. The augmented map can then be displayed by the stand-alone augmented map application and/or can be printed onto paper or other physical media.

Besides using the screenshot of the digital map as input to the operations in some embodiments, an alternative could be to ask the user to enter the name of the city, or automatically detect the current city. Then all the locations previously saved within the defined geographic range of the city can be operationally obtained for use as candidate map augmentation information. If the user has not yet saved a screenshot of the digital map from an on-line server before opening the stand-alone augmented map application, the application can trigger execution of an on-line map application, e.g., Google Maps, by the mobile device 100 to obtain the digital map there from, or provide operations that assist the user with taking a display screenshot of a portion of a digital map from the on-line map application.

Besides using a photo rather digital image of the physical map as input, alternative operation can be to receive input in real-time from the mobile device camera while the user pointing the camera at the physical map. The operations can identify features within the imaged physical map, obtain map augmentation information based on the identified features, and display the map augmentation information on the display device of the mobile device 100 and/or on an AR headset for viewing by the user in combination with the imaged physical map, which can facilitate a user's ability to annotate the physical map to include the map augmentation information.

Various corresponding operations will now be described in the context of FIG. 5 which illustrates a method and operations by a stand-alone application executed by the mobile device 100 of FIG. 1B to temporarily interface with an on-line map application of the map server 140 and then operates in a stand-alone mode in accordance with some embodiments. During one phase of operation, operations 500 are performed by a stand-alone augmented map application in combination with an on-line map application. During another phase of operation, other operations 510 are performed by the stand-alone augmented map application.

Figure 5:
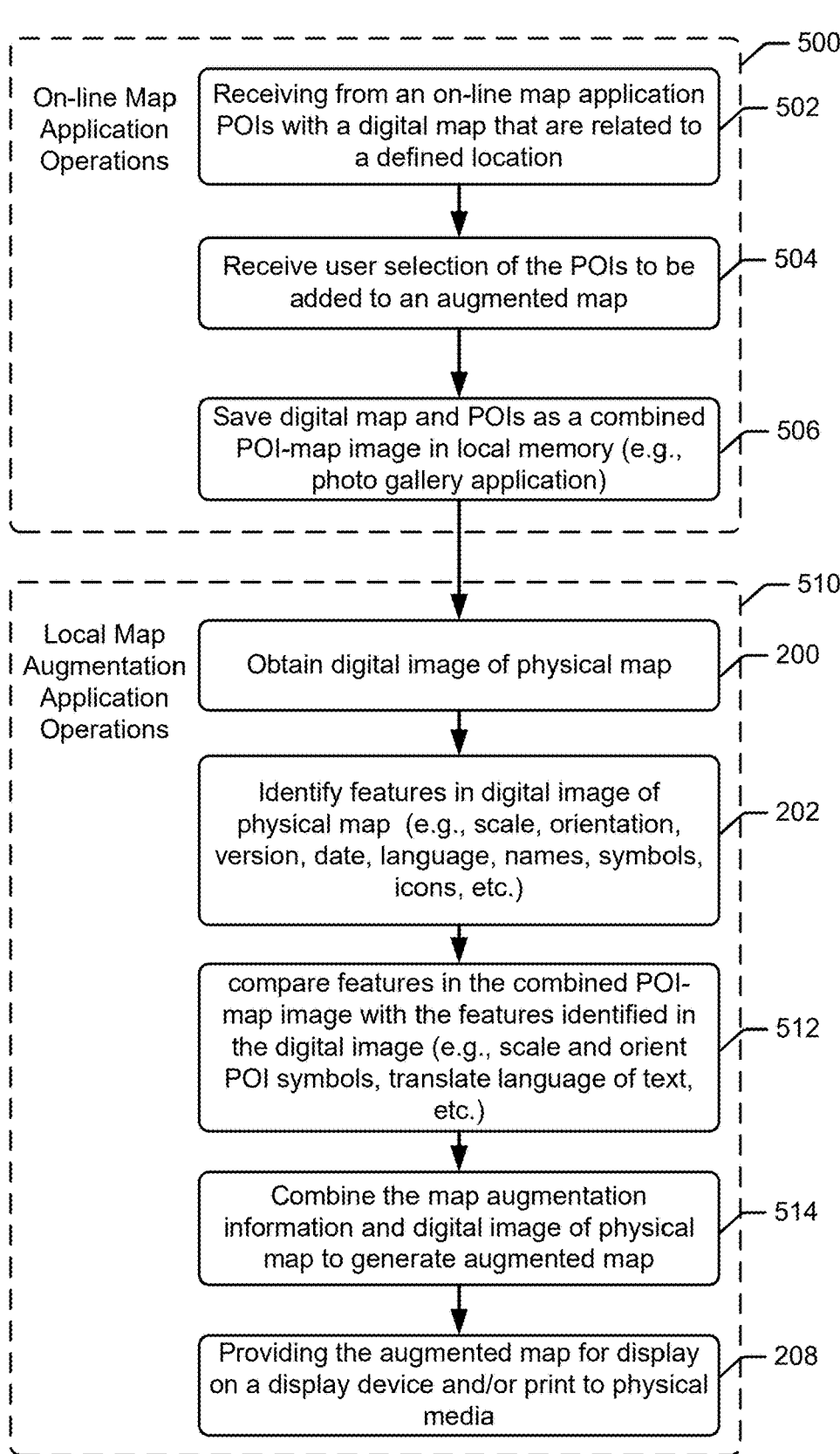
FIG. 5 illustrates a method and operations by a stand-alone application executed by the mobile device of FIG. 1B that temporarily interfaces with an on-line map application of the map server and then operates in a stand-alone mode in accordance with some embodiments.

Referring to FIG. 5, the stand-alone augmented map application receives 502 from the on-line map application POIs within a digital map that are related to a defined location. The stand-alone augmented map application receives 504 user selections of POIs of the digital map to be added to the augmented map, and saves 506 the digital map and selected POIs as a combined POI-map image in local memory of the mobile computing device. The stand-alone augmented map application obtains 200 digital image of the physical map and identifies 202 features in the digital image of the physical map. Map augmentation information is obtained (204 of FIG. 2) by operations that include comparing 512 features in the combined POI-map image with the features that have been identified (202 of FIG. 2) in the digital image. An augmented map is generated (206 of FIG. 2) by operations that include combining 514 the map augmentation information and the digital image of the physical map. The augmented map can then be provided 208 for display on display device (e.g., display device of the mobile device 100 and/or connected thereto, display device of an AR/VR/mixed-reality headset, projector, etc.). The operations 200, 202, and/or 208 may be performed as explained above with regard to FIG. 2.

In a further embodiment, the operations to identify 202 features in the digital image can include identifying a scale and orientation of features in the digital image of the physical map. The operation to generate 206 the augmented map based on the map augmentation information can include scaling and orienting how the map augmentation information is to be displayed in the augmented map based on the identified scale and orientation of features in the digital image of the physical map. It is noted that some physical maps have scale details printed thereon and/or have legends or other descriptive information that is useful for interpreting the map. The operations may identify the scale details printed on the printed map which can then be used to adjust a scale factor applied to the digital map and/or of the map augmentation information when generating the augmented map. The operations may determine a scale factor to be applied when generating the augmented map based on, for example, comparing features (road segment, road intersection, city block, etc.) in the digital map to corresponding features in the digital image of the physical map, and determining the scale factor based on how much the compared features need to be enlarged or reduced in size to become aligned.

In another further embodiment, the operations to identify 202 features in the digital image can include identifying a language of features in the digital image of the physical map. The operations to obtain 204 the map augmentation information can include determining a default user language defined for a user interface of the mobile computing device, and responsive to the identified language being different than the default user language operations can perform translation of the features from the identified language to the default user language. The translation operation may output translation of the features in more than one language, such as in a local language based on location of the mobile terminal, a native language of the user (e.g., based on default language setting in the mobile terminal), etc.

Some further embodiments are directed to providing operations that can align a pose and compute a scale of an augmented map that is projected onto a physical map. For example, the mobile device 100 can include the projector component 104 and/or be communicatively connected to a projector and/or the AR headset 320 to project or display a virtual projection of the augmented map on the physical map.

For example, the operations can identify features in a digital image of the physical map captured by the mobile device camera 102, and control the alignment and/or scale of the map augmentation information that is projected relative to the physical map. The operations may for example, enable a person to view POIs, language translated textual names and/or descriptions, which are aligned and are scaled for viewing by the user relative to corresponding features on the physical map.

The operations may enable a user to provide input for user interface and/or to perform gestures relative to a display of the mobile device 100 and/or relative to the physical map, to cause the operations to zoom-in or zoom-out how much and/or a level of detail of the map augmentation information that is projected for viewing by the user relative to the physical map. For example, while viewing an augmented map formed by map augmentation information projected onto an entire city of the physical map, the user may perform a pinch gesture to zoom-and on a portion of the city to see (have projected) more particular information about a POI (e.g., restaurant), such as the operating hours, menu or other services, customer posted reviews, and/or pictures associated with the POI.

Various corresponding operations will now be described in the context of FIG. 6 which illustrates a method and operations by the mobile device 100, the map server 140, and/or another network node for adapting how augmentation information is used to generate an augmented map based on user commands received via a user interface in accordance with some embodiments.

Figure 6:
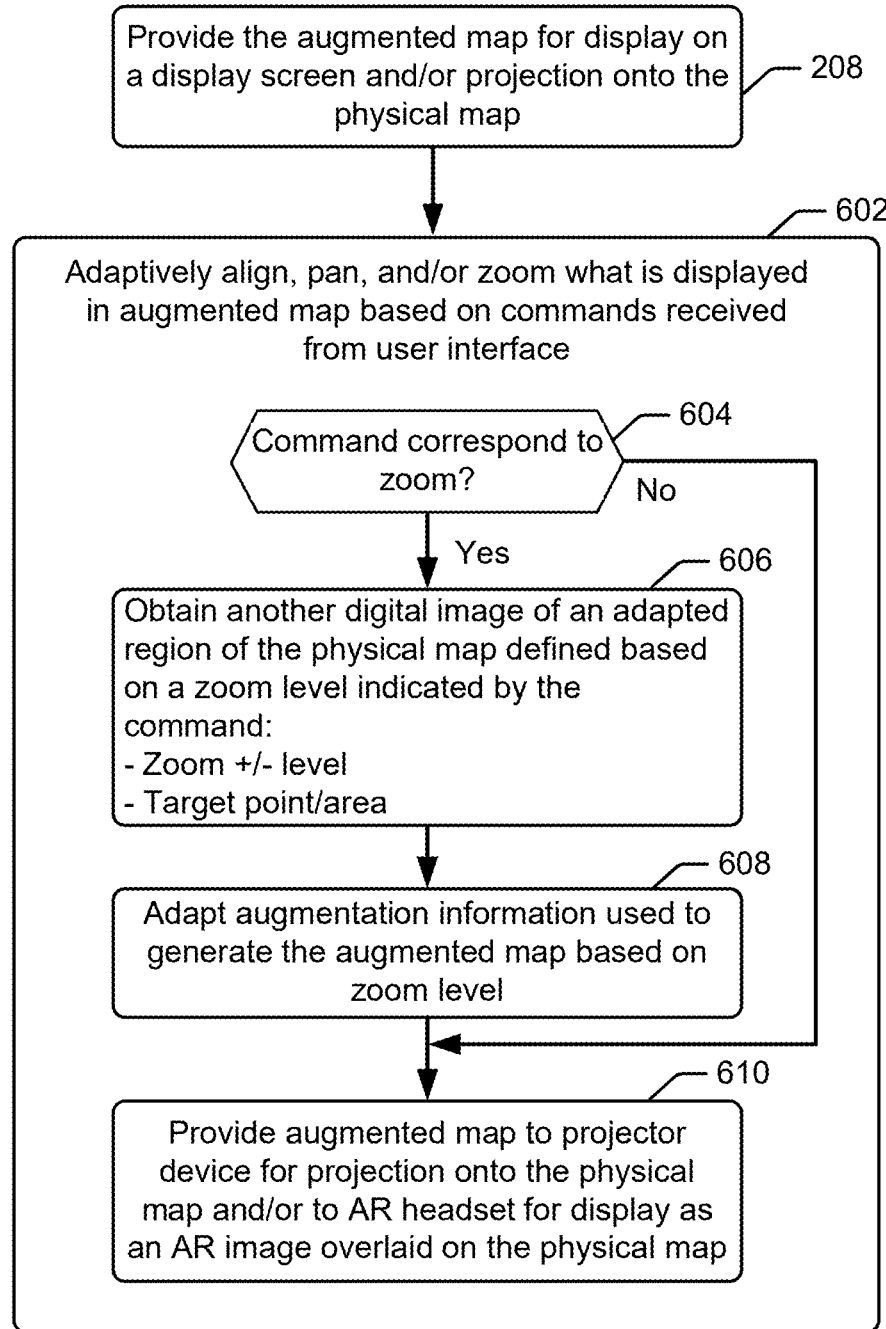
FIG. 6 illustrates a method and operations by the mobile device and/or the map server of FIG. 1B and/or another network node for adapting how augmentation information is used to generate an augmented map based on user commands received via a user interface in accordance with some embodiments.

Referring to FIG. 6, while the augmented map is provided 208 for display on a display screen and/or projected onto the physical map, operations are performed 602 to adaptively aligned, pan, and/or zoom what is displayed 208 in the augmented map based on commands received from the user interface. In some embodiments, the operations 602 to adapt the alignment, pan, and/or zoom what is displayed 208 in the augmented map, can include responding to a determination 604 that the command corresponds to a zoom-in command, by obtaining 606 another digital image for a smaller region of the physical map defined based on a zoom-in level and/or target point/area relative to the physical map indicated by the zoom-in command, and adapting 608 which of the map augmentation information is used to generate 206 the augmented map. The operations to provide 208 the augmented map can include providing 610 the augmented map to a projector device for projection onto the physical map and/or to an AR headset for display on a see-through display screen viewable by a user as an AR image on the physical map.

In some embodiments, the operations can interpret the user command based on a user gesture, e.g., pinch-zoom using fingers relative to a point or region on the physical map, that is sensed by the mobile device camera. Responsive to sensing a user gesture performed with respect to a particular one of the identified features in the digital map, the operations adapt which of the map augmentation information associated with the particular one of the identified features in the digital map is used to generate 206 the augmented map. For example, the user may point, tap, and/or gesture relative to a building or other POI of the physical map to cause operations to obtain and display information concerning the building or other POI. The way further example, a user may point to a building of the physical map to cause operations to retrieve a name of a business within the building, hours of operation of the business, customer reviews of the business, services provided by the business, photos within and/or outside the business, etc.

Some further embodiments are directed to providing operations that can detect user input, such as by a finger or object pointed towards the physical map and/or a gesture formed by movement of the object and/or fingers relative to the physical map. The operations can interpret the user input as commands to pan (e.g., move location in the two dimensional display frame), zoom-in, zoom-out, and adjust how much augmentation information and/or a level of detail augmentation information that is to be included in augmented map. The user may point to a location on the physical map and/or mark a location on the physical map to cause location to be included as a POI among the map augmentation information that is used to generate the augmented map.

Various corresponding operations will now be described in the context of FIG. 7 which illustrates a method and operations by the mobile device 100 and/or the map server 140 of FIG. 1B and/or another network node for adapting how augmentation information is used to generate an augmented map based on user gesture based commands sensed via a camera relative to a physical map in accordance with some embodiments.

Figure 7:
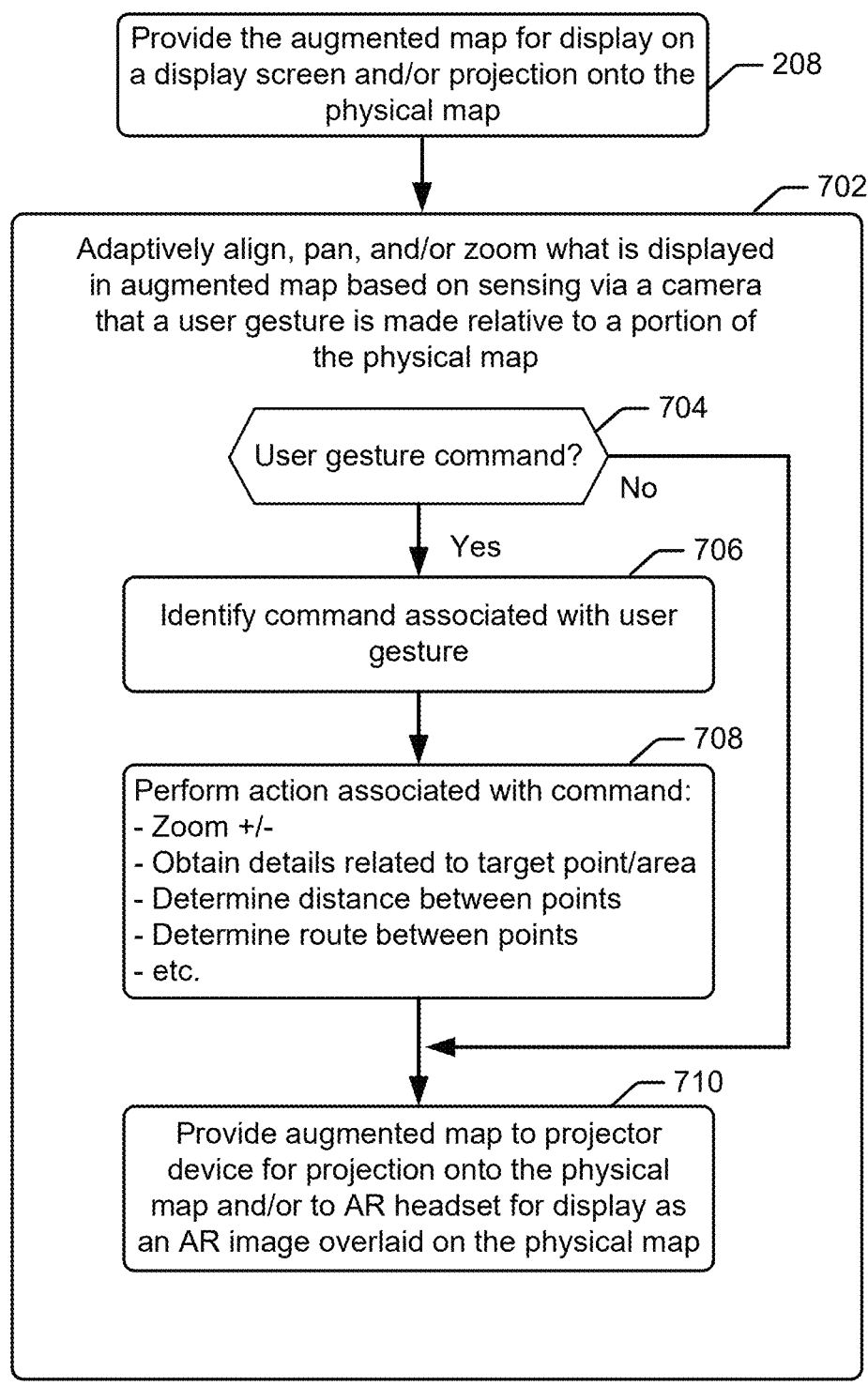
FIG. 7 illustrates a method and operations by the mobile device and/or the map server of FIG. 1B and/or another network node for adapting how augmentation information is used to generate an augmented map based on user gesture based commands sensed via a camera relative to a physical map in accordance with some embodiments.

Referring to FIG. 7, while the augmented map is provided 208 for display on a display screen and/or projected onto the physical map, operations are performed 702 to adaptively aligned, pan, and/or zoom what is displayed 208 in the augmented map based on sensing via a camera that a user gesture is made relative to a portion of the physical map. When a user's gesture command is sensed 704 relative to the physical map, the operations identify 706 a command that is associated with the user gesture, e.g., inward pinch between two fingers corresponds to a zoom-out command.

In one embodiment, the operations adapt 702 the alignment, pan, and/or zoom of what is displayed 208 in the augmented map based on sensing via a camera that a user gesture is made relative to a portion of the physical map. In a further embodiment, the operations to adapt 702 the alignment, pan, and/or zoom of what is displayed 208 in the augmented map, include identifying 706 a command that is associated with the user gesture, and performing 708 an action adapting which of the map augmentation information is used to generate 206 the augmented map. The operations to provide 208 the augmented map may then include providing 710 the augmented map to a projector device for projection onto the physical map and/or to an AR headset for display on a see-through display screen viewable by a user as an AR image overlaid on the physical map.

Operations may use natural language processing in combination with the camera to auto-tag any POIs that are identified on the physical map in its digital image using keywords and sentences extracted from performing natural image processing on sensed voice, e.g., via a microphone, regarding the POIs. For example when interacting with a concierge at a hotel who recommends a POI such as a restaurant while pointing to the POI on the physical map, the mobile device 100 and/or an AR/extended reality headset can operate to auto-tag the corresponding location ("input from concierge at hotel X") and auto-tag the digital image with text, e.g., "pasta restaurant must-go".

Corresponding operations that can be performed when obtaining 204 the map augmentation information based on the identified features, can include: performing natural language processing on digitized sound from a microphone to identify keywords associated with the digital image of the physical map, identifying POIs based on the identified keywords, determining locations of the POIs relative to the digital image of the physical map, and generating the map augmentation information based on the POIs that are identified and the determined locations of the POIs relative to the digital image of the physical map.

Some or all operations described above as being performed by the mobile device 100 and/or the map server 140 may alternatively be performed by another node that is part of a cloud computing resource. For example, those operations can be performed as a network function that is close to the edge, such as in a cloud server or a cloud resource of a telecommunications network operator, e.g., in a CloudRAN or a core network.

Figure 8:
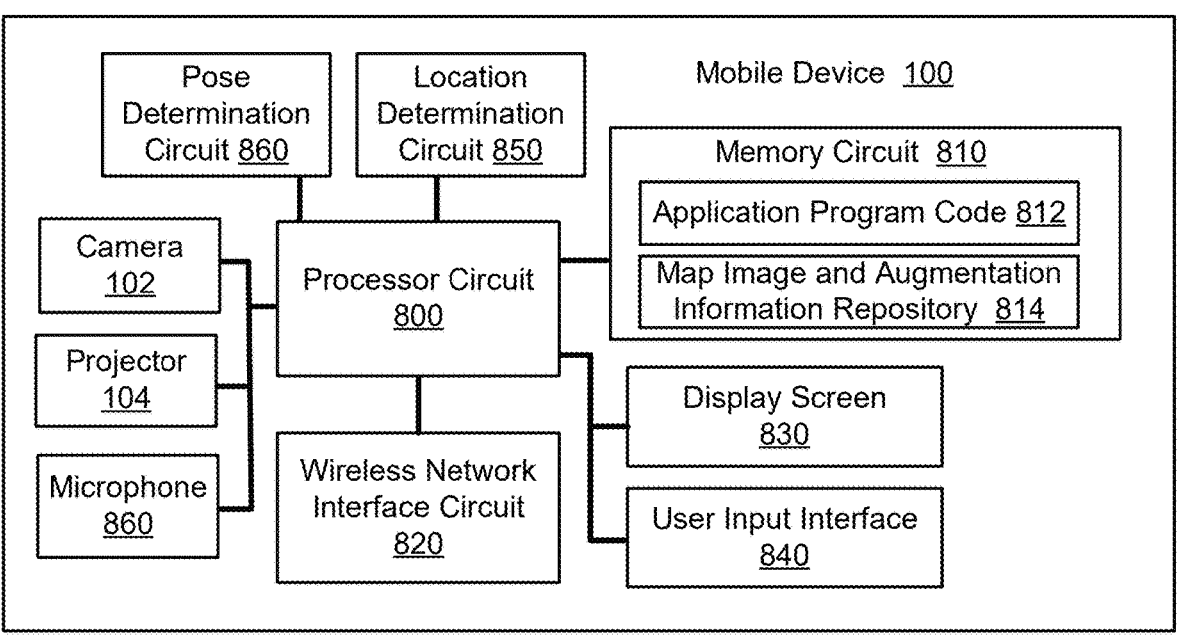
FIG. 8 is a block diagram of components of the mobile device of FIG. 1B which are configured to operate in accordance with some embodiments of the present disclosure.

FIG. 8 is a block diagram of components of a mobile device 100 that are configured in accordance with some other embodiments of the present disclosure. The mobile device 100 may include a wireless network interface circuit 820, a location determination circuit 850, a microphone 860, a display device 830, a user input interface 840 (e.g., keyboard or touch sensitive display), a camera 102, a pose determination circuit 860 (e.g., multiaxis accelerometer, tilt sensor, feature pose identification in video from the camera), projector 104, at least one processor circuit 800 (processor), and at least one memory circuit 810 (memory). The memory 810 stores application program code 812 that is executed by the processor 800 to perform operations. The memory 810 may also include map information and/or an augmentation information repository 814. The processor 800 may include one or more data processing circuits, such as a general purpose and/or special purpose processor (e.g., microprocessor and/or digital signal processor), which may be collocated or distributed across one or more data networks. The processor 800 is configured to execute computer program instructions among program code 812 in the memory 810, described below as a computer readable medium, to perform some or all of the operations and methods for one or more of the embodiments disclosed herein for a mobile device. The wireless network interface circuit 820 may be configured to communicate with signaling and protocols defined based on GSM, wideband code division multiple access (WCDMA), Long Term Evolution (LTE), New Radio (NR), WiFi, and/or any other wireless communication technologies. The location determination circuit 850 may be configured to determine a location of the mobile device 100 based on satellite positioning (e.g., GNSS (Global Navigation Satellite Systems), GPS (Global Positioning System), GLO-NASS, Beidou or Galileo) and/or based on ground-based network-assisted positioning (e.g., cellular tower triangulation based on signaling time-of-flight or Wi-Fi based positioning).

Figure 9:
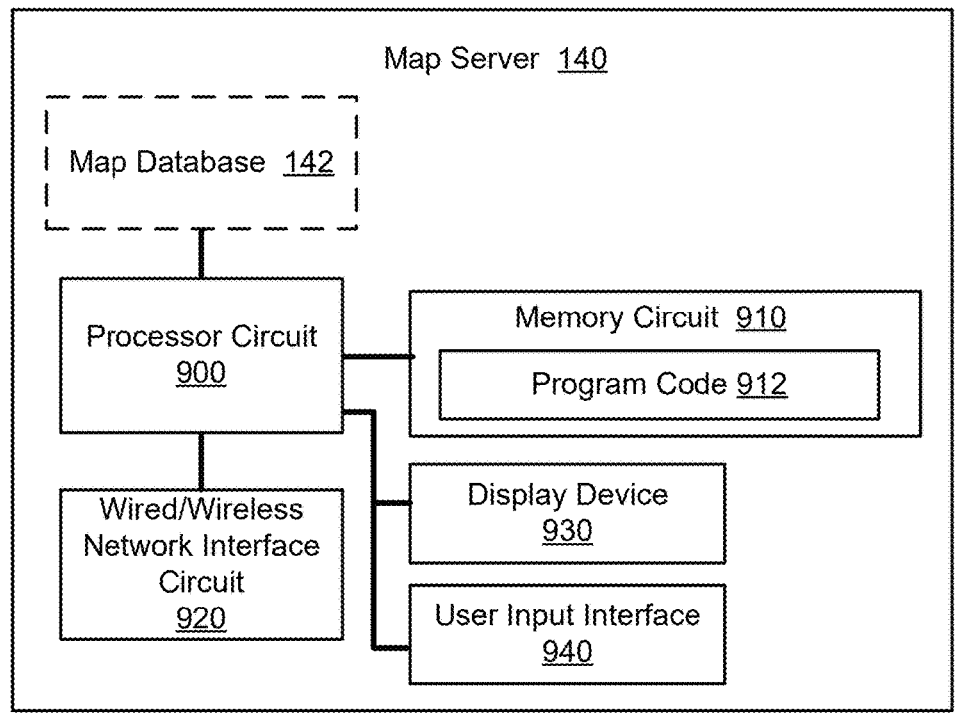
FIG. 9 is a block diagram of components of the map server of FIG. 1B which are configured to operate in accordance with some embodiments of the present disclosure.

FIG. 9 is a block diagram of components of a map server 140 which operate according to at least some embodiments of the present disclosure. The map server 140 may include a wired and/or wireless network interface circuit 920, at least one processor circuit 900 (processor), and at least one memory circuit 910 (memory). The network interface circuit 920 is configured to communicate with mobile devices via wireless networks. The map server 140 may further include the map database 142 or be communicatively connected thereto, a display device 930 and a user input interface 940. The memory 910 stores program code 912 that is executed by the processor 900 to perform operations. The processor 900 may include one or more data processing circuits, such as a general purpose and/or special purpose processor (e.g., microprocessor and/or digital signal processor), which may be collocated or distributed across one or more data networks. The processor 900 is configured to execute computer program instructions among program code 912 in the memory 910, described below as a computer readable medium, to perform some or all of the operations and methods for one or more of the embodiments disclosed herein for a map server.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method by a computing device, the method comprising:

obtaining a digital image of a physical map;

identifying features in the digital image;

obtaining map augmentation information based on the identified features;

generating an augmented map based on the map augmentation information; and providing the augmented map for display;

wherein the method further comprises:

determining a pose for an augmented reality (AR) image based on a pose of an AR headset and a pose of the physical map, wherein the generating of the augmented map comprises generating the AR image based on the augmentation information and the determined pose; and wherein the providing of the augmented map comprises providing the AR image to a see-through display screen of the AR headset for display with the determined pose on a see-through display screen for viewing by a user as an overlaid AR image on the physical map.

2. The method of claim 1, wherein obtaining a digital image of the physical map, comprises receiving a digital picture of the physical map from a camera of a mobile device, a camera communicatively connected to the mobile device, a scanner device, and/or a digital picture repository communicatively connected to the mobile device.

3. The method of claim 1, further comprising:

determining a pose for an augmented reality (AR) image based on a pose of a projector device and a pose of the physical map, wherein the generating of the augmented map comprises generating the AR image based on the map augmentation information and the determined pose, and wherein the providing of the augmented map comprises providing the AR image to the projector device for projection with the determined pose onto the physical map.

4. The method of claim 1, further comprising:

receiving, from an on-line map application, points-of-interest (POIs) within a digital map that are related to a defined location; and receiving user selections of POIs of the digital map to be added to the augmented map, wherein the obtaining of the map augmentation information comprises generating the map augmentation information based on a combination of the selected POIs and the features that have been identified in the digital image, and wherein the generating of the augmented map comprises combining the map augmentation information and the digital image of the physical map.

5. The method of claim 1, further comprising:

receiving, from an on-line map application, points-of-interest (POIs) within a digital map that are related to a defined location;

receiving user selections of POIs of the digital map to be added to the augmented map; and saving the digital map and selected POIs as a combined POI-map image in local memory of the computing device, wherein the obtaining of the map augmentation information comprises comparing features in the combined POI-map image with the features that have been identified in the digital image, and wherein the generating of the augmented map comprises combining the map augmentation information and the digital image of the physical map.

6. The method of claim 1, wherein:

the identifying of features in the digital image comprises identifying a scale and orientation of features in the digital image of the physical map; and the generating of the augmented map based on the map augmentation information comprises scaling and orienting how the map augmentation information is to be displayed in the augmented map based on the identified scale and orientation of features in the digital image of the physical map.

7. The method of claim 1, wherein:

the identifying of features in the digital image comprises identifying a language of features in the digital image of the physical map; and the obtaining of the map augmentation information comprises determining a default user language defined for a user interface, and responsive to the identified language being different than the default user language performing translation of the features from the identified language to the default user language.

8. The method of claim 1, further comprising:

adapting alignment, pan, and/or zoom of what is displayed in the augmented map based on command received from a user interface.

9. The method of claim 8, wherein the adapting alignment, pan, and/or zoom of what is displayed in the augmented map, comprises:

responsive to determining that the command corresponds to a zoom-in command, obtaining another digital image for a smaller region of the physical map defined based on a zoom-in level indicated by the zoom-in command, and adapting which of the map augmentation information is used to generate the augmented map, wherein the providing of the augmented map comprises providing the augmented map to a projector device for projection onto the physical map and/or to an augmented reality (AR) headset for display on a see-through display screen viewable by a user as an AR image on the physical map.

10. The method of claim 1, further comprising:

responsive to sensing a user gesture performed with respect to a particular one of the identified features in the digital map, adapting which of the map augmentation information associated with the particular one of the identified features in the digital map is used to generate the augmented map.

11. The method of claim 1, further comprising:

adapting alignment, pan, and/or zoom of what is displayed in the augmented map based on sensing via a camera that a user gesture is made relative to a portion of the physical map.

12. The method of claim 11, wherein the adapting alignment, pan, and/or zoom of what is displayed in the augmented map, comprises:

identifying a command that is associated with the user gesture; and performing an action adapting which of the map augmentation information is used to generate the augmented map, wherein the providing of the augmented map comprises providing the augmented map to a projector device for projection onto the physical map and/or to an augmented reality (AR) headset for display on a see-through display screen viewable by a user as an AR image overlaid on the physical map.

13. The method of claim 1, wherein the obtaining of the map augmentation information based on the identified features comprises:

performing natural language processing on digitized sound from a microphone to identify keywords associated with the digital image of the physical map;

identifying points-of-interest (POIs) based on the identified keywords;

determining locations of the POIs relative to the digital image of the physical map; and generating the map augmentation information based on the POIs that are identified and the determined locations of the POIs relative to the digital image of the physical map.

14. The method of claim 1, wherein the computing device comprises a mobile device that provides the augmented map to a connected display screen.

15. The method of claim 1, wherein the computing device comprises a map server that provides the augmented map to a mobile device for display.

16. A computing device comprising:

at least one processor;

at least one memory connected to the at least one processor and storing program code that is executed by the at least one processor to perform operations to:

obtain a digital image of a physical map;

identify features in the digital image;

obtain map augmentation information based on the identified features;

determine a pose for an augmented reality (AR) image based on a pose of an AR headset and a pose of the physical map;

generate an augmented map based on the map augmentation information and the determined pose; and provide the augmented map for display, wherein providing the augmented map for display comprises providing the AR image to a see-through display screen of the AR headset for display with the determined pose on a see-through display screen for viewing by a user as an overlaid AR image on the physical map.

17. The computing device of claim 16, wherein the computing device comprises a mobile device, and the at least one processor is configured to provide the augmented map to at least one of a display screen component of the mobile device, a projector component of the mobile device, and a see-through display screen of an augmented reality headset communicatively connected to the mobile device.

18. The computing device of claim 16, wherein the computing device comprises a map server, and the at least one processor is configured to provide the augmented map to at least one of a display screen component of a mobile device communicatively connected to the map server, a projector component of the mobile device, and a see-through display screen of an augmented reality headset communicatively connected to at least one of the map server and the mobile device.

19. A non-transitory computer readable medium storing program code executable by at least one processor of a computing device, the program code being configured to cause the at least one processor to perform operations comprising:

obtaining a digital image of a physical map;

identifying features in the digital image;

obtaining map augmentation information based on the identified features;

determining a pose for an augmented reality (AR) image based on a pose of an AR headset and a pose of the physical map;

generating an augmented map based on the map augmentation information and the determined pose; and providing the augmented map for display, wherein providing the augmented map for display comprises providing the AR image to a see-through display screen of the AR headset for display with the determined pose on a see-through display screen for viewing by a user as an overlaid AR image on the physical map.

* * * * *